United States Patent [19]

Londt et al.

[11] Patent Number: 5,019,986
[45] Date of Patent: May 28, 1991

[54] METHOD OF OPERATING A VEHICLE ENGINE

[75] Inventors: Edward E. Londt, Fort Wayne, Ind.; Robert T. Schaar, Chillicothe, Ill.

[73] Assignees: Caterpillar Inc., Peoria; Navistar International Corporation, Chicago, both of Ill.

[21] Appl. No.: 515,727

[22] Filed: Apr. 27, 1990

[51] Int. Cl.$^5$ .............................................. B60K 31/00
[52] U.S. Cl. ......................... 364/426.04; 364/431.07; 180/179
[58] Field of Search .................... 364/426.04, 431.07, 364/442; 123/352, 357; 180/176, 177, 178, 179

[56] References Cited

U.S. PATENT DOCUMENTS

| | | | |
|---|---|---|---|
| 4,368,705 | 1/1983 | Stevenson et al. | 123/357 |
| 4,374,422 | 2/1983 | O'Keefe, Jr. et al. | 364/426.04 |
| 4,467,428 | 8/1984 | Caldwell | 364/426.04 |
| 4,493,303 | 1/1985 | Thompson et al. | 123/352 |
| 4,498,016 | 2/1985 | Earleson et al. | 290/40 R |
| 4,506,752 | 3/1985 | Hara et al. | 180/179 |
| 4,559,599 | 12/1985 | Habu et al. | 364/442 |
| 4,698,762 | 10/1987 | Moriya et al. | 364/442 |
| 4,709,335 | 11/1987 | Okamoto | 364/431.07 |
| 4,736,813 | 4/1988 | Hayama et al. | 180/177 |
| 4,905,785 | 3/1990 | Kieffer et al. | 180/179 |
| 4,914,597 | 4/1990 | Moncelle et al. | 364/431.07 |
| 4,917,206 | 4/1990 | Hara | 180/179 |
| 4,930,594 | 6/1990 | Koshizawa et al. | 180/179 |

FOREIGN PATENT DOCUMENTS 2141269A 5/1983 United Kingdom .

OTHER PUBLICATIONS

Patent Abstracts of Japan, vol. 9, No. 57 (M-363) (1780), Mar. 13, 1985, JP-A-59 192839 (Yanmar Diesel), Nov. 1, 1984.
Patent Abstracts of Japan, vol. 7, No. 9, (M-185) (1154), Jan. 14, 1983, JP-A-57 168038 (Nippon-Denso), Oct. 16, 1982.

Primary Examiner—Gary Chin
Attorney, Agent, or Firm—William E. McCracken

[57] ABSTRACT

A method of operating a vehicle engine equipped with a cruise control includes the step of operating the engine in accordance with fuel delivery limits within a first range of delivery limits when the speed of the vehicle is less than a first speed limit and the cruise control is engaged such that the engine is controlled to permit acceleration of the vehicle under substantially all operating conditions. The engine is operated in accordance with fuel delivery limits within a second range of delivery limits less than the first range of delivery limits when the speed of the vehicle is greater than the first speed limit but less than a second speed limit. The engine is operated in accordance with fuel delivery limits within a third range of delivery limits less than the second range of delivery limits when the speed of the vehicle is greater than the second speed limit whereby the engine is controlled to permit acceleration of the vehicle under less than substantially all operating conditions thereof. Such a method allows an operator of the vehicle to accelerate when traveling downhill beyond the second speed limit so that sufficient momentum can be gained to crest an upcoming hill.

10 Claims, 5 Drawing Sheets

METHOD OF OPERATING A VEHICLE ENGINE

CROSS REFERENCE TO RELATED APPLICATION

The present application is related to Moncelle, et al. U.S. patent application Ser. No. 07/222,786, filed July 22, 1988, now U.S. Pat. No. 4,914,597, entitled "Engine Cruise Control With Variable Power Limits", which is expressly incorporated by reference herein.

TECHNICAL FIELD

The present invention relates generally to engine controls, and more particularly to a method of operating an internal combustion engine wherein fuel delivery limits are established in dependence upon whether a cruise control is engaged.

BACKGROUND

Typically, electronic engine controls for use in vehicles include a cruise control which allows an operator to select and maintain a desired vehicle speed under usual operating conditions without the necessity of operating the throttle control. Such cruise controls, however, are not capable of maintaining speed regulation when the engine is operating outside predetermined limits. For example, the actual vehicle speed may drop below or rise above a permissible range of vehicle speeds surrounding the selected speed when the vehicle is ascending or descending a hill or when wind or other external factors provide sufficient forces on the vehicle to oppose or aid the power developed by the engine. In such a case, it is necessary for the operator to manually intervene if it is desired to maintain the speed of the vehicle within the permissible range. In the case of speeds below the permissible range, it is typically necessary for the operator to downshift in order to provide greater torque to the wheels so that the vehicle speed can be increased. This manual downshifting is objectionable and should be eliminated, if possible.

Prior art approaches to the problem of downshifting while operating in cruise control have involved the use of a semi-automatic transmission which automatically downshifts the transmission without leaving the cruise control mode when the vehicle speed reaches a predetermined limit below the desired or commanded speed. Such an approach reduces the number of manual transmission downshifts, but does not reduce the total number of gear shifts. Thus, the demands placed upon the transmission are not lessened.

The following patents disclose engine controls but do not address the problems noted above while operating in a cruise control mode.

Thompson, et al. U.S. Pat. No. 4,493,303 discloses an engine control wherein data representing a plurality of separate power curves are stored in a memory and the data are used to control fuel rack limits. The engine is typically utilized with a transmission having different gear ranges. During operation of the engine, the particular gear range of the transmission is detected by sensing road speed and engine speed and the data representing a particular power curve are retrieved from the memory in dependence upon the detected gear range. The data are used to establish the rack limits during operation in such gear range in order to produce desired operating characteristics and fuel economy. This patent also discloses the use of a cruise control, although the problems noted above are not even recognized.

Stevenson, et al. U.S. Pat. No. 4,368,705 discloses an engine control system in which a throttle controls the delivery of fuel by a fuel pump to the engine. The control system further includes a fuel pump rack limit circuit which controls the rate of fuel delivery to the engine in accordance with rack limits and a timing circuit which controls the timing of injection of fuel into the engine cylinders. The timing and rack limits are established in accordance with engine conditions to obtain maximum engine performance with smoke and emission levels limited to those required by the Environmental Protection Agency (EPA).

More particularly, a rack limit position map is stored in a memory and includes rack limit position values which are predetermined in accordance with the physical characteristics of the fuel pump. This map is coupled to a first input of a least wins logic selector circuit which is in turn coupled to a rack limit control loop. A second input of the least wins logic selector circuit is coupled to the output of a summing junction which in turn sums the output of a torque rise limit map and an altitude derating map stored in additional memories. The torque rise limit map develops rack limit position control signal values which are predetermined to allow more fuel to be injected in the engine cylinders at lower speeds to prevent engine lugging without exceeding EPA emissions standards. The altitude derating map develops rack limit position control signal values which are predetermined to meet EPA standards for different levels of ambient air pressure. These values decrease the fuel rack limits at high altitudes to maintain an optimal fuel/air ratio.

The least wins logic selector circuit selects the lesser of the output from the rack limit position map and the summing junction and provides such lesser value to the rack position control loop. Thus, the rack limit is set by the lesser of the rack limit position map and the torque rise limit map as derated by the altitude derating map output.

The rack limit is used to control the maximum rack position of the fuel pump so that the rate of fuel delivery may not be increased by the throttle beyond the rack limit.

Earleson, et al., U.S. Pat. No. 4,498,016 discloses a governor control for an engine in which a desired power setting is used to develop a speed error and the speed error is in turn used to determine a desired rack position for a rack actuator that controls the fuel delivery rate to the engine. The desired rack position is compared with the actual rack position to create a rack position error signal, which is in turn used by a rack position control loop to drive the rack position toward the desired position. If a power setting is issued for positive acceleration, it is possible that the commanded acceleration of the engine will require more rack than is called for from the rack position actuator, thereby producing a negative rack error while a power increase is commanded. The resulting "dip" is eliminated by temporarily adding an acceleration signal to the position error signal to compensate for the lag in the desired rack position signal.

The foregoing patents are expressly incorporated by reference herein.

The Moncelle, et al. U.S. Pat. No. 4,914,597 incorporated by reference herein discloses a control for and method of operating a vehicle engine equipped with a cruise control. A memory is provided having stored therein first and second sets of data representing first and second different fuel delivery limit curves representing different fuel delivery limits as a function of engine speed. At least a portion of the first set of data is retrieved from the memory when the cruise control is engaged, and at least a portion of the second set of data is retrieved from the memory when the cruise control is not engaged. The retrieved set of data is then used to develop a command signal for a rack delivery control to in turn control the rate of fuel delivery to the engine. More particularly, the first and second sets of data represent rack limit curves for a mechanical rack-type fuel control. The first rack limit curve establishes rack limits as a function of engine speed greater than the rack limits established by the second set of data as a function of engine speed over a majority of the speed range. Thus, when the cruise control is engaged, a high engine output power is available, if needed so that an operator is less likely to have to downshift in order to provide the torque required to maintain the actual vehicle speed at the desired vehicle speed.

The control disclosed in the above-identified Moncelle, et al. patent has been adapted to include features acknowledged to be prior art with respect to this patent that reduce engine horsepower when the cruise control is engaged and the vehicle is traveling at a high speed. More specifically, a cruise control speed setting may be manually established by an operator between lower and upper setting limits. When the cruise control is engaged, a determination is made whether the speed of the vehicle is less than the upper setting limit. If so, a further determination is made whether the vehicle speed is less than the cruise control setting plus a certain amount, such as 2 m.p.h. If this is also true, high engine rack limits are established. If one of these conditions is not satisfied, a determination is made whether the vehicle speed is greater than a vehicle speed limit. If not, lesser engine rack limits are established so that reduced engine horsepower is developed. This horsepower, while less than the horsepower developed by the engine when operating under the high engine rack limits, is still sufficient to permit acceleration of the vehicle under substantially all operating conditions. On the other hand, if the speed of the vehicle exceeds the vehicle speed limit, engine rack limits are selected such that substantially zero horsepower is developed by the engine.

While the above features have been found to conserve fuel, it has also been found that the driver is occasionally prevented from exercising discretionary control over vehicle speed under certain conditions. For example, when operating the vehicle using the cruise control at or above the vehicle speed limit, the driver cannot increase his speed when going down a hill in order to gain momentum to crest an upcoming grade. Thus, the driver is restricted in his ability to maintain an average vehicle ground speed.

The present invention is directed to overcoming one or more of the problems set forth above.

DISCLOSURE OF THE INVENTION

In accordance with the present invention, a method of operating a vehicle engine equipped with a cruise control which is engageable to maintain the speed of the vehicle at a desired speed permits an operator to command acceleration of the vehicle even when the speed of the vehicle exceeds a vehicle speed limit so that the above problem is avoided.

More specifically, a method of operating a vehicle engine equipped with a cruise control includes the step of operating the engine in accordance with fuel delivery limits within a first range of delivery limits when the cruise control is engaged and the speed of the vehicle is less than a first speed limit so that the engine is controlled to permit acceleration of the vehicle under substantially all operating conditions thereof. The engine is operated in accordance with fuel delivery limits within a second range of delivery limits less than the first range of delivery limits when the speed of the vehicle is greater than the first speed limit but less than a second speed limit. The engine is further operated in accordance with fuel delivery limits within a third range of delivery limits less than the second range of delivery limits when the vehicle speed is greater than the second speed limit whereby the engine is controlled to permit acceleration of the vehicle under less than substantially all operating conditions thereof.

In a preferred embodiment of the invention, when the vehicle is traveling at a speed greater than the second speed limit but less than the third speed limit, the operator may command engine horsepower sufficient to accelerate the vehicle when the vehicle is traveling downhill. It should be noted that the horsepower available in this range of speeds is preferably insufficient to accelerate the vehicle when the vehicle is traveling on a level surface or uphill.

The method of the present invention allows an operator to exercise discretion when the cruise control is engaged to pick up speed when traveling downhill so that a higher average speed can be maintained.

DESCRIPTION OF THE PREFERRED EMBODIMENT

Figure 1:
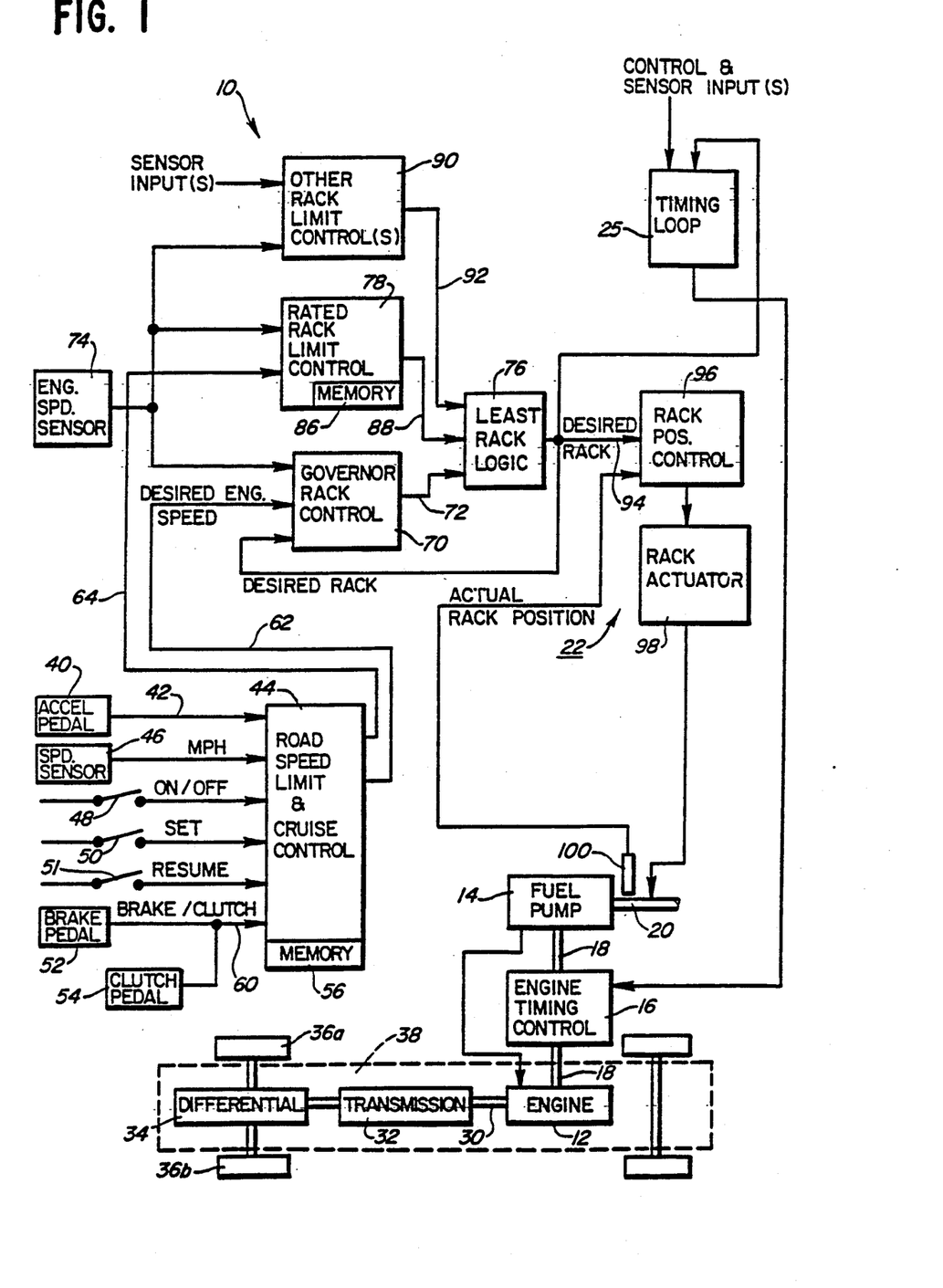
FIG. 1 is a block diagram of an engine and drive train of a vehicle in conjunction with an engine control implementing the method of the present invention.

Referring now to FIG. 1, there is illustrated an engine control 10 which controls an engine 12 via a fuel delivery system in the form of a fuel pump 14 and an engine timing control 16. The fuel pump 14 includes a fuel rack 20 which is positionable within a range of rack positions by a rack position control loop, illustrated generally at 22. The rack position control loop develops a position command signal described hereinafter which controls the rate of fuel delivery by the fuel pump 14 to the engine 12.

The engine timing control 16 is responsive to a timing control loop 25 to in turn control the timing of fuel injection by the fuel pump 14 relative to top dead center of each piston of the engine 12.

The engine 12 is coupled by a drive shaft 30 to a transmission 32 which is operable in a plurality of gear ratios or ranges. The transmission 32 is in turn coupled through a differential 34 to one or both of a pair of wheels 36a, 36b of a vehicle, shown generally at 38. Of course, the vehicle may alternatively include tandem axles and/or dual wheels, if desired.

The speed of the vehicle 38 may be varied by an accelerator or throttle pedal 40 which is controlled by an operator of the vehicle 38. The accelerator or throttle pedal 40 develops a signal on a line 42 which is coupled to a road speed limit and cruise control 44. The control 44 also receives inputs from a speed sensor 46 which detects the ground speed in miles per hour of the vehicle 38 as well as inputs from three switches, 48, 50 and 51, a brake pedal 52 and a clutch pedal 54. When the switch 48 is closed, a signal is passed to the road speed limit and cruise control 44 to engage the cruise control mode of operation. When the switch 50 is momentarily closed, the current speed of the vehicle as detected by the speed sensor 46 is stored in a memory 56 within the control 44. The speed comprises a cruise control speed setting or command CCS when operating in the cruise control mode. If this switch 50 is closed for longer than a predetermined time, for example one second, the speed setting CCS is increased with time until the switch 50 is opened. The switch 51, when momentarily closed, commands the control 44 to resume cruise control operation at the speed setting CCS which is stored in the memory 56 of the control 44. If the switch 51 is closed for longer than the predetermined time, the speed setting CCS is decreased with time until this switch is opened.

When either the brake pedal 52 or clutch pedal 54 is depressed, a signal is coupled over a line 60 to the control 44 to disengage the cruise control mode of operation.

The cruise control 44 develops a first output on a line 62 representing the desired speed in r.p.m. of the engine 12. The control 44 also develops signals on lines 64 representing whether the cruise control is engaged and, if so, the speed setting CCS for the vehicle 38 as stored in the memory 56 of the control 44.

The line 62 is coupled to a governor rack control 70 which provides data as a signal on a line 72 represented by a governor rack control curve. This curve defines a series of governor rack positions or settings as a function of actual engine speed as detected by an engine speed sensor 74 and desired engine speed as indicated by the signal on the line 62. The signal on the line 72 developed by the control 70 is coupled to a first input of a least rack logic circuit 76.

The signals on the lines 64 developed by the control 44 are coupled to one input of a rated rack limit control 78 which also receives an input from the engine speed sensor 74. The rated rack limit control 78 includes a memory in the form of an EPROM 86 which stores a plurality of sets of data each representing a fuel delivery limit curve as a function of engine speed. In the preferred embodiment, the fuel delivery system is of the rack type, and thus the sets of data represent a plurality of rated rack limit control curves defining rated rack limit positions or settings as a function of engine speed. The rack limit control selects one of the sets of data from the memory 86 based upon a control method described in connection with FIG. 4 hereinafter, uses the data to develop a signal which varies with engine speed and provides such signal to a second input of the least rack logic circuit 76 over a line 88.

Each set of data includes a predetermined number of digital data values each representing a rack limit at a particular engine speed. The rack limits for engine speeds not stored in the memory 86 are obtained by determining the closest engine speeds below and above the current engine speed for which rack limits are stored and linearly interpolating between these two rack limits.

Further rack limit data may be provided as a signal on a line 92 to a third input of the least rack logic circuit 76. The data transmitted on the line 92 may be provided by one or more other rack limit controls 90 which may be responsive to sensor inputs.

The magnitude of the signal provided on the line 72 by the governor rack control 70 varies with engine speed and such magnitude is continuously compared against the speed-variable magnitude of the signals provided by the controls 78 and 90 on the lines 88 and 92, respectively. The signal having the least magnitude is passed over a line 94 to a rack position control 96 which is coupled to a rack actuator 98. The rack actuator 98 in turn controls the position of the rack 20 in response to a rack position command signal developed by the rack position control 96. The actual rack position is sensed by a position sensor 100 and is passed as a signal back to the rack position control 96.

Figure 2A:
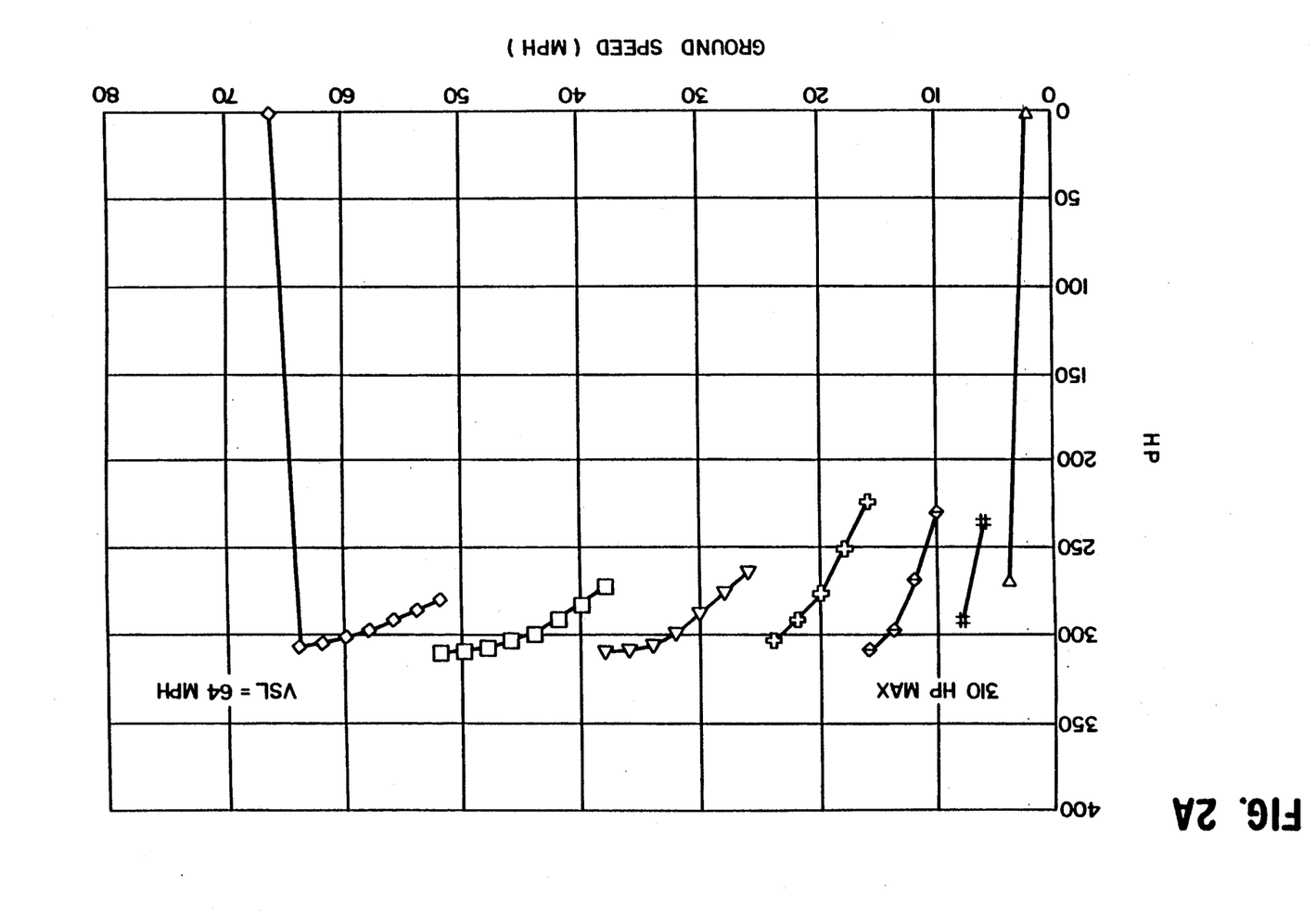
FIGS. 2A and 2B comprise a series of horsepower curves as a function of vehicle ground speed illustrating the operation of the engine control of FIG. 1 in accordance with a prior art control method.
Figure 2B:
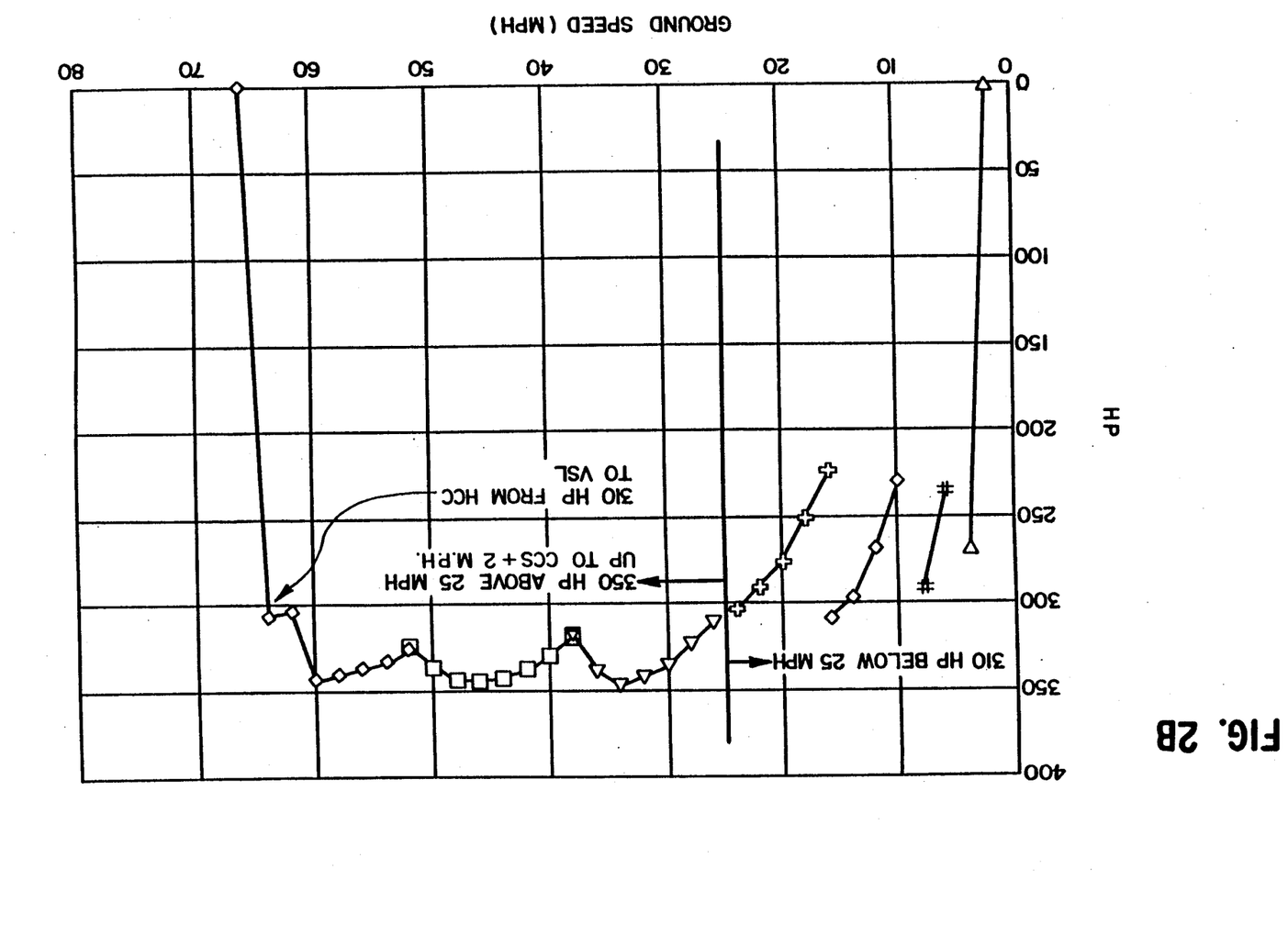

Referring now to FIGS. 2A and 2B, there is shown a series of curves illustrating the operation of the control of FIG. 1 in accordance with a prior art method. FIG. 2A illustrates for each gear range the available horsepower developed by the engine 12 under control of the engine control 10 when the cruise control is not engaged. During such operation, the available horsepower from the engine 12 is limited to a first predetermined value, such as 310 horsepower. More specifically, the engine is operated according to a first rack limit curve when the vehicle is operating in a gear other than the highest gear. Although not shown in FIG. 2A, the engine 12 is operated according to a second, derated rack limit curve when the vehicle is operating in the highest gear. In either case, if an operator of the vehicle 38 attempts to accelerate beyond a vehicle speed limit VSL (equal to 64 m.p.h. in FIG. 2A), the engine control 10 adjusts the rack limits via the rack position control 96 and rack actuator 98 to cause the engine 12 to develop zero horsepower. This, in turn, establishes an upper vehicle speed limit for the vehicle 38 so that fuel economy is improved.

FIG. 2B illustrates the operation of the engine 12 in accordance with the prior art method when the cruise control is engaged. The primary difference in operation over that illustrated in FIG. 2A is that the maximum horsepower limits for each gear at ground speeds in excess of a cruise control minimum speed setting of, for example, 25 m.p.h., are increased to a value of, for example, 350 horsepower. Also, for ground speeds in excess of the cruise control setting CCS plus a certain amount, for example, 2 m.p.h., or in excess of the highest permissible cruise control setting (designated HCC) up to the VSL speed, engine horsepower is limited to 310 horsepower.

As should be evident from the foregoing, greater horsepower is available when the cruise control is engaged above 25 m.p.h. This encourages operation using the cruise control which is generally a more efficient mode of operation. Thus, when operating in this mode, higher horsepower limits can be used without sacrificing fuel economy.

Figure 3:
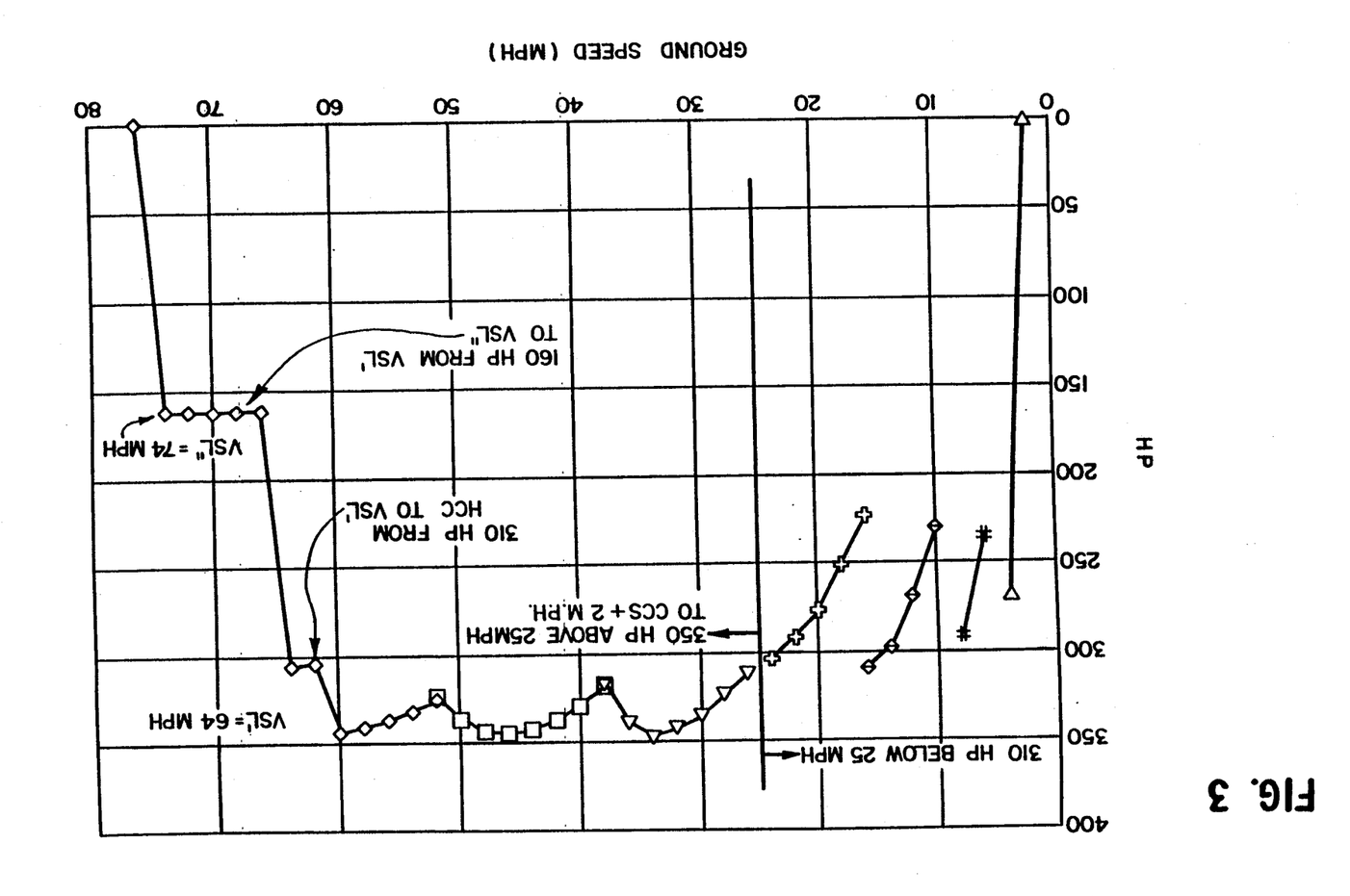
FIG. 3 comprises a series of horsepower curves as a function of vehicle ground speed illustrating the operation of the engine control of FIG. 1 according to the method of the present invention.

Referring now to FIG. 3, there is illustrated the operation of the engine 12 in accordance with the method of the present invention. The curves of FIG. 3 are identical to the curves of FIG. 2 until a vehicle speed limit VSL' which may be, for example, 64 m.p.h., is reached. Thereafter, engine horsepower is maintained in a range of values different than the range of horsepower values maintained during operation below such speed. Specifically, engine horsepower is limited to an intermediate, substantially constant level of, for example, 160 horsepower, until a further vehicle speed limit VSL" is reached. This vehicle speed limit may be, for example, 74 m.p.h. For vehicle speeds above 74 m.p.h., the engine control 10 adjusts the rack limits to cause engine output horsepower to drop to zero.

Summarizing operation of the engine control 10 in accordance with the method of the present invention, when the cruise control is engaged, a higher engine power output is permitted, thereby allowing greater torque to be made available to the operator so that the need for downshifting is lessened. Also, when the vehicle is traveling downhill, an operator can override the speed setting CCS of the cruise control by depressing the accelerator pedal 40, thereby allowing acceleration of vehicle to a speed beyond a speed which exceeds the cruise control setting CCS by a certain amount and beyond the maximum cruise control setting HCC. During operation above these speeds and below the upper speed limit VSL', sufficient horsepower is provided to allow continued acceleration downhill. It should be noted that the horsepower in this range is predetermined to allow an operator under certain load conditions and external factors to maintain speed on a level surface so that momentum can also be maintained until the next uphill grade. If desired, the horsepower available in this speed range may be adjusted upwardly or downwardly to limit acceleration when traveling downhill or to allow acceleration when traveling on a level surface. In any event, available horsepower from the engine 12 is limited so that acceleration is available only under selected vehicle operating conditions.

Figure 4:
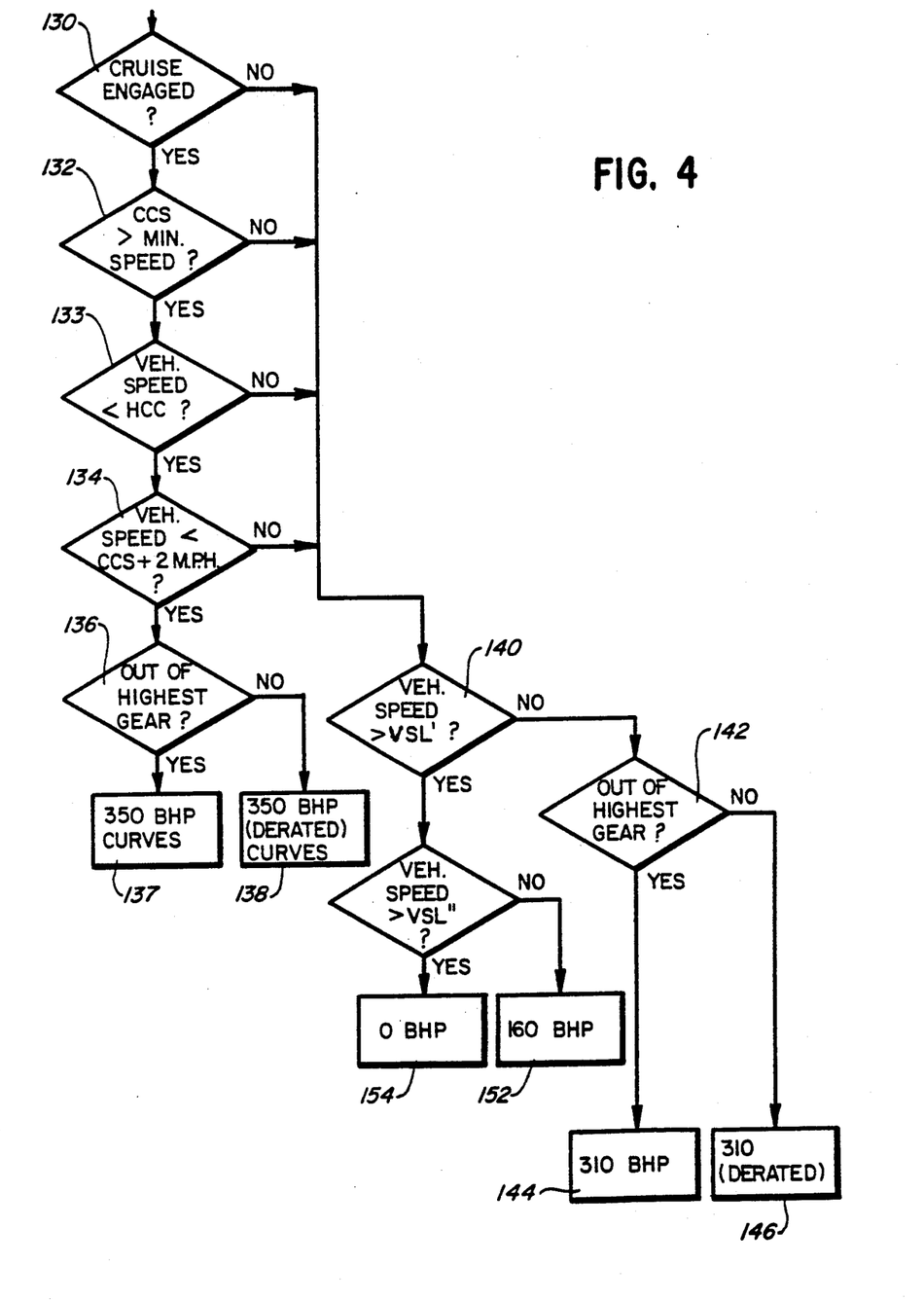
FIG. 4 comprises a flowchart of programming executed by the road speed limit and cruise control block and/or the rated rack limit block of FIG. 1 to effect the method of the present invention.

FIG. 4 illustrates programming executed by the rated rack limit control 78 for retrieving the sets of data provided as signals on the line 88 to the least rack logic circuit 76. The programming shown in FIG. 4 may alternatively be executed by the road speed limit and cruise control 44, if desired, in which case the memory 86 may be located in the control 44.

The program of FIG. 4 selects one of six sets of data from the memory 86 in dependence upon: (1) whether the cruise control is engaged; (2) the ground speed of the vehicle and (3) whether the vehicle transmission 32 is operating in the highest gear. As noted in the above-referenced Moncelle, et al., patent application, if the transmission 32 is operating in the highest gear, engine torque and horsepower are limited below a particular engine speed range to reduce the amplitude response of the drive train comprising the transmission 32 and the differential 34 within such speed range.

The program begins at a series of blocks 130, 132, 133, 134 and 136 which check various operating parameters to determine which of the first through sixth sets of data is to be retrieved from the memory 86. In summary, higher rated rack limits, and thus higher engine output torque and horsepower levels, are made available when: (1) the cruise control is engaged; (2) the cruise control speed setting is greater than the minimum predetermined speed (e.g. 25 m.p.h.); and (3) the vehicle speed is less than the highest permitted speed setting HCC and less than the cruise control set speed plus the predetermined amount of 2 m.p.h. In addition, all of the rack limits are derated in a certain engine speed range when the transmission 32 is operating in the highest gear or gears.

More particularly, the block 130 checks to determine whether the cruise control has been engaged. If this is the case, the block 132 checks the signal on the line 64 to determine whether the cruise control speed setting indicated on the line 64 is greater than the minimum predetermined speed of 25 m.p.h. If so, control passes to the block 133 which determine if the vehicle ground speed as detected by the speed sensor 46 is less than the highest permitted setting HCC. If this is also true, the block 134 checks to determine whether the vehicle ground speed is less than the cruise control speed setting CCS plus the certain amount of 2 m.p.h. If this is also the case, control passes to the block 136 which checks to determine whether the transmission is operating in other than the highest gear. If not, a first set of data represented by the horsepower curves of FIG. 3 is retrieved from the memory 86 and delivered as a signal over the line 88 to the least rack logic circuit 76. On the other hand, if the transmission 32 is operating in the highest gear, a second set of data is selected from the memory 86 and passed as a signal over the line 88. As previously noted, this set of data results in derated engine output torque and horsepower below a certain engine speed, such as 1200 r.p.m., as compared with the engine output in this speed range resulting from selection of the first set of data. Engine operation is otherwise identical to the operation illustrated by FIG. 3.

If any of the questions posed by the blocks 130, 132, 133 or 134 is answered in the negative, then it has been determined that the increased rack limits represented by the horsepower curves of FIG. 3 are not to be used. A block 140 thus checks to determine whether the ground speed of the vehicle is greater than the speed limit VSL'. If not, a block 142 determines whether the transmission is out of the highest gear, and if so, a third set of data resulting in engine operation represented by the horsepower curves of FIG. 2A is retrieved from the memory 86 and passed as a signal to the least rack logic circuit 76 by a block 144. Otherwise, a block 146 retrieves a fourth set of data from the memory 86 and passes such data as a signal to the least rack logic circuit 76. This set of data, like the second set of data described above, results in derated engine operation below a certain engine speed as compared with the third set of data.

If the block 140 determines that the vehicle speed is greater than VSL', a block 148 checks to determine whether the vehicle speed is greater than the speed limit VSL". If not, a block 152 retrieves the set of data from the memory 86 which results in the engine developing 160 horsepower. Otherwise a block 154 retrieves the set of data which results in the engine developing substantially zero horsepower.

It can be seen that the control of the present invention permits an operator to command higher rack limits when operating with the cruise control engaged so that the need for downshifting is reduced. This results in improved maintenance of the commanded vehicle speed in the cruise control mode. Also, the operator may accelerate downhill even above a vehicle speed limit so that a higher average speed can be maintained.

It should be noted that a different number of sets of data and/or different data values may be stored in the memory 86 so that engine output power may be tailored to other operating factors or conditions, if desired.

We claim:

1. A method of operating an engine of a vehicle equipped with a cruise control which is engageable to control the speed of the vehicle wherein the engine is controlled by an engine control that establishes fuel delivery limits as a function of speed of the vehicle, the method comprising the steps of:
   (a) operating the engine in accordance with fuel delivery limits within a first range of delivery limits when the cruise control is engaged and the speed of the vehicle is less than a first speed limit whereby the engine is controlled to permit acceleration of the vehicle under a certain number of operating conditions thereof;
   (b) operating the engine in accordance with fuel delivery limits within a second range of delivery limits less than the first range of delivery limits when the speed of the vehicle is greater than the first speed limit but less than a second speed limit; and
   (c) operating the engine in accordance with fuel delivery limits within a third range of delivery limits less than the second range of delivery limits when the vehicle speed is greater than the second speed limit whereby the engine is controlled to permit acceleration of the vehicle under a number of operating conditions less than said certain number of operating conditions.

2. The method of claim 1, including the further steps of establishing a cruise control speed setting CCS representing a desired speed of the vehicle wherein said CCS can be established in a range between a minimum speed and an upper limit HCC, checking when the cruise control is engaged to determine if the vehicle speed is less than said HCC and operating the engine in accordance with fuel delivery limits within the second range or third range of delivery limits if the vehicle speed is not less than said HC.

3. The method of claim 1, including the further steps of establishing a cruise control speed setting CCS representing a desired speed of the vehicle, checking when the cruise control is engaged to determine if the vehicle speed is less than said CCS plus a predetermined amount and operating the engine in accordance with the second range or third range of delivery limits if the vehicle speed is not less than said CCS plus the predetermined amount.

4. The method of claim 1, including the further step of (d) operating the engine in accordance with fuel delivery limits within a fourth range of delivery limits less than the third range of delivery limits when the vehicle speed is greater than a third speed limit wherein the third speed limit is greater than the second speed limit.

5. The method of claim 1, including the further steps of checking to determine whether the cruise control is engaged and operating the engine in accordance with fuel delivery limits within the second, third or fourth range of delivery limits when the cruise control is not engaged.

6. The method of claim 1, including the further steps of establishing a cruise control speed setting CCS representing a desired speed of the vehicle wherein said CCS can be established in a range between a minimum speed and an upper limit HCC, checking to determine if the vehicle speed is less than said HCC, checking to determine if the vehicle speed is less than said CCS plus a predetermined amount and operating the engine in accordance with fuel delivery limits within the second range or third range of delivery limits if the vehicle speed is not less than said HCC or not less than said CCS plus the predetermined amount.

7. The method of claim 4, wherein the engine includes a fuel rack which is positionable within a range of rack positions to in turn determine the horsepower developed by the engine and wherein the fuel delivery limits represent rack limits for the fuel rack and wherein the step (d) comprises the step of positioning the rack to cause the engine to develop substantially zero horsepower.

8. The method of claim 7, wherein the step (c) includes the step of establishing a rack limit which permits the engine to develop sufficient horsepower to accelerate the vehicle only when the vehicle is traveling downhill but not when the vehicle is traveling on a level surface.

9. A method of operating a diesel engine of a vehicle while a cruise control is engaged to control a speed of the vehicle wherein the engine is controlled by an engine control which establishes rack limits as a function of speed of the vehicle, the method comprising the steps of:
   (a) operating the engine in accordance with rack limits within a first range when the speed of the vehicle is less than a first speed limit whereby the engine is controlled to permit acceleration of the vehicle;
   (b) operating the engine in accordance with rack limits within a second range less than the first range when the speed of the vehicle is greater than the first speed limit and less than a second speed limit;
   (c) operating the engine in accordance with rack limits within a third range less than the second range when the speed of the vehicle is greater than the second speed limit and less than a third speed limit whereby the engine is controlled to permit acceleration of the vehicle only when the vehicle is traveling downhill; and
   (d) operating the engine in accordance with rack limits within a fourth range less than the third range when the vehicle speed is greater than the third speed limit whereby the engine develops substantially zero horsepower.

10. The method of claim 9, including the further steps of establishing a cruise control speed setting CCS representing a desired speed of the vehicle wherein said CCS can be established in a range between a minimum speed and an upper limit HCC, checking to determine if the vehicle speed is less than said HCC, checking to determine if the vehicle speed is less than said CCS plus a determined amount and operating the engine in accordance with rack limits within the second, third or fourth range if the vehicle speed is not less than said HCC or not less than said CCS plus the predetermined amount.

* * * * *